(12) United States Patent
Willi et al.

(10) Patent No.: US 9,995,202 B2
(45) Date of Patent: Jun. 12, 2018

(54) SPARKPLUG ASSEMBLY WITH PRECHAMBER VOLUME

(71) Applicant: Caterpillar Inc., Peoria, IL (US)

(72) Inventors: Martin Willi, Dunlap, IL (US); Charlie Kim, Dunlap, IL (US)

(73) Assignee: Caterpillar Inc., Deerfield, IL (US)

(*) Notice: Subject to any disclaimer, the term of this patent is extended or adjusted under 35 U.S.C. 154(b) by 0 days. days.

(21) Appl. No.: 15/229,821

(22) Filed: Aug. 5, 2016

(65) Prior Publication Data

US 2018/0038269 A1    Feb. 8, 2018

(51) Int. Cl.
| F02B 19/10 | (2006.01) |
| F02B 19/18 | (2006.01) |
| F02P 13/00 | (2006.01) |
| F02D 41/30 | (2006.01) |

(52) U.S. Cl.
CPC .......... *F02B 19/1004* (2013.01); *F02B 19/18* (2013.01); *F02D 41/3005* (2013.01); *F02P 13/00* (2013.01)

(58) Field of Classification Search
CPC .. F02B 19/1004; F02B 19/18; F02D 41/3005; F02P 13/00
See application file for complete search history.

(56) References Cited

U.S. PATENT DOCUMENTS

| 7,237,526 | B2 | 7/2007 | Tourteaux et al. |
| 7,623,955 | B1 | 11/2009 | Rackmil et al. |
| 7,922,551 | B2 | 4/2011 | Tozzi |
| 9,212,613 | B2 | 12/2015 | Argolini et al. |
| 9,500,118 | B2 * | 11/2016 | Tozzi; Luigi P ........ F02B 19/08 |
| 9,593,633 | B1 * | 3/2017 | Kim ..................... F02D 41/0077 |
| 2005/0072399 | A1 * | 4/2005 | Kojic ......................... F02B 5/00 123/254 |
| 2005/0072400 | A1 * | 4/2005 | Kojic ......................... F02B 1/12 123/256 |
| 2007/0022736 | A1 | 2/2007 | Durling et al. |
| 2013/0055986 | A1 * | 3/2013 | Tozzi ..................... F02B 19/12 123/254 |
| 2013/0197786 | A1 * | 8/2013 | Genko .................... F02D 41/00 701/108 |

(Continued)

FOREIGN PATENT DOCUMENTS

| EP | 1143126 A2 | 10/2001 |
| WO | WO 2014/053167 A1 | 4/2014 |
| WO | WO 2014/191085 A1 | 12/2014 |

*Primary Examiner* — Joseph Dallo
(74) *Attorney, Agent, or Firm* — Leydig, Voit & Mayer, Ltd.; Steve D. Lundquist

(57) ABSTRACT

A sparkplug assembly having a prechamber volume is operatively associated with the combustion chamber of an internal combustion engine such that the prechamber volume is in fluid communication with the combustion chamber. To purge exhaust gasses from the prechamber volume prior to ignition, the sparkplug assembly is operatively associated with a high-pressure air/fuel source that directs a pressurized air/fuel purge charge to the prechamber volume. The pressurized air/fuel purge charge may be at stoichiometric conditions. The high-pressure air/fuel source is configured to direct the pressurized air/fuel purge charge during at least a portion of the compression stroke to maintain a largely stoichiometric mixture of air and fuel in the prechamber volume.

20 Claims, 3 Drawing Sheets

(56) References Cited

U.S. PATENT DOCUMENTS

| | | | |
|---|---|---|---|
| 2014/0196686 A1* | 7/2014 | Coldren | F02B 19/12 |
| | | | 123/299 |
| 2014/0224208 A1 | 8/2014 | Gruber et al. | |
| 2015/0059456 A1* | 3/2015 | Niessner | F02P 15/006 |
| | | | 73/114.19 |
| 2016/0053667 A1 | 2/2016 | Loetz et al. | |
| 2016/0053668 A1* | 2/2016 | Loetz | F02B 19/1085 |
| | | | 123/260 |
| 2016/0053670 A1* | 2/2016 | Tozzi | F02B 19/08 |
| | | | 123/260 |
| 2016/0348569 A1* | 12/2016 | Kim | F02B 19/12 |
| 2017/0074184 A1* | 3/2017 | Kim | F02D 41/0077 |

* cited by examiner

SPARKPLUG ASSEMBLY WITH PRECHAMBER VOLUME

TECHNICAL FIELD

This patent disclosure relates generally to an internal combustion engine and, more particularly, to a sparkplug assembly having a prechamber volume for igniting combustion in the main combustion chamber of the engine.

BACKGROUND

Internal combustion engines combust fuel to convert the potential chemical energy therein to mechanical power that can be utilized for various applications. A common configuration of an internal combustion engine includes a combustion chamber formed as a cylinder with a reciprocal piston slideably disposed therein. Air is drawn into the cylinder by the downward motion of the piston with respect to the lengthwise dimension of the cylinder. Fuel is introduced to the cylinder either by direct injection, port fuel injection (PFI), or by being premixed with air that is drawn in. The piston reciprocally moves toward the top of the cylinder in a compression stroke compressing the air therein. The compressed air and introduced fuel are combusted forcing the piston again to move downwards in a power stroke. The engine can harness the forced motion of the piston for other work, such as propelling a vehicle, operating an implement, or running a pump or generator.

A variety of fuels can be combusted, including hydrocarbon-based fuels such as the traditional gasoline or diesel or alternatively liquid natural gas (LNG) or compressed natural gas (CNG). Ignition of the fuel in the combustion chamber may be induced by a sparkplug or glowplug, although in other embodiments the fuel may be susceptible to auto-ignition due to compression from the upward motion of the piston. In some embodiments, a pre-combustion chamber or prechamber may be located proximate to and in fluid communication with the main combustion chamber that serves as an additional volume in which a mixture of fuel and air is initially ignited to induce combustion in the combustion chamber. More specifically, an electrode disposed in the prechamber volume may ignite the fuel and air therein which then propagates through various ports to the main combustion chamber. Hence, the prechamber serves as a sparkplug or ignition element for the main chamber. One possible configuration for a prechamber is described in co-pending U.S. Patent Publication No. 2016/0053667 ("the '667 publication"), titled "Pre-Chamber Assembly for an Engine" and assigned to the assignee of the present application.

The '667 publication structurally describes a prechamber volume in communication with the main combustion chamber via a plurality of ports. Another channel introduces fuel to the prechamber volume via a valve mechanism. The '667 publication concerns designs for the channel and valve mechanism that achieve an optimal air-fuel mixture in the pre-chamber to improve the combustion process. Likewise, the present disclosure describes a prechamber assembly, serving as a sparkplug assembly for the main combustion chamber, that is designed to optimize the air-fuel mixture therein to facilitate the combustion process.

SUMMARY

The disclosure describes, in one aspect, a sparkplug assembly for an internal combustion engine formed with a prechamber configuration. The sparkplug assembly includes a prechamber shell enclosing a prechamber volume and has a distal end cap configured for placement in a combustion chamber. To establish fluid communication between the prechamber volume and the combustion chamber, having a plurality of ports are disposed in the distal end cap. To initiate ignition in the prechamber volume, a ignition element including an electrode is disposed in the prechamber volume. The sparkplug assembly also includes a high-pressure air/fuel source in fluid communication with the prechamber volume. The high-pressure air/fuel source is configured to introduce a pressurized air/fuel purge charge into the prechamber volume during a compression stroke in the combustion chamber and is further configured to cease introducing the pressurized air/fuel purge charge prior to ignition in the prechamber volume by activation of the ignition element.

In another aspect, the disclosure describes a method of conducting a combustion cycle in a combustion chamber utilizing a sparkplug assembly having a prechamber configuration. The method involves conducting an intake stroke during which a piston movably disposed in the combustion chamber moves to a bottom dead center position. A pressurized air/fuel purge charge is introduced into a prechamber volume of the sparkplug assembly disposed partially in the combustion chamber that thereby purges gasses from the prechamber volume into the combustion chamber. The method conducts a compression stroke during which the piston moves toward a top dead center position. During the compression stroke, the method maintains introduction of the pressurized air/fuel purge charge into the prechamber volume by assistance from a high-pressure air/fuel source operatively associated with the sparkplug assembly to continue purging residual gasses from the prechamber to the combustion chamber. The method ceases introduction of the pressurized air/fuel purge charge prior to the piston reaching the top dead center position and ignites the pressurized air/fuel purge charge in the prechamber volume.

In yet another embodiment, the disclosure describes an internal combustion engine operating with a sparkplug assembly having a prechamber configuration. The internal combustion engine includes a combustion chamber with a piston reciprocally movable therein between a top dead center position and a bottom dead center position. The sparkplug assembly is operatively associated with the combustion chamber and includes a prechamber volume delineated by a prechamber shell that is in fluid communication with the combustion chamber. A plurality of ports disposed through the prechamber shell establish fluid communication between the prechamber volume and the combustion chamber. The sparkplug assembly further includes an ignition element having an electrode disposed in the prechamber volume. The internal combustion engine also includes a high-pressure air/fuel source operatively associated with the sparkplug assembly and in fluid communication with the prechamber volume. The high-pressure air/fuel source is configured to direct a pressurized air/fuel purge charge to the prechamber volume as the piston moves through a compression stroke from the bottom dead center position to the top dead center position to purge gasses from the prechamber volume.

DETAILED DESCRIPTION

Figure 1:
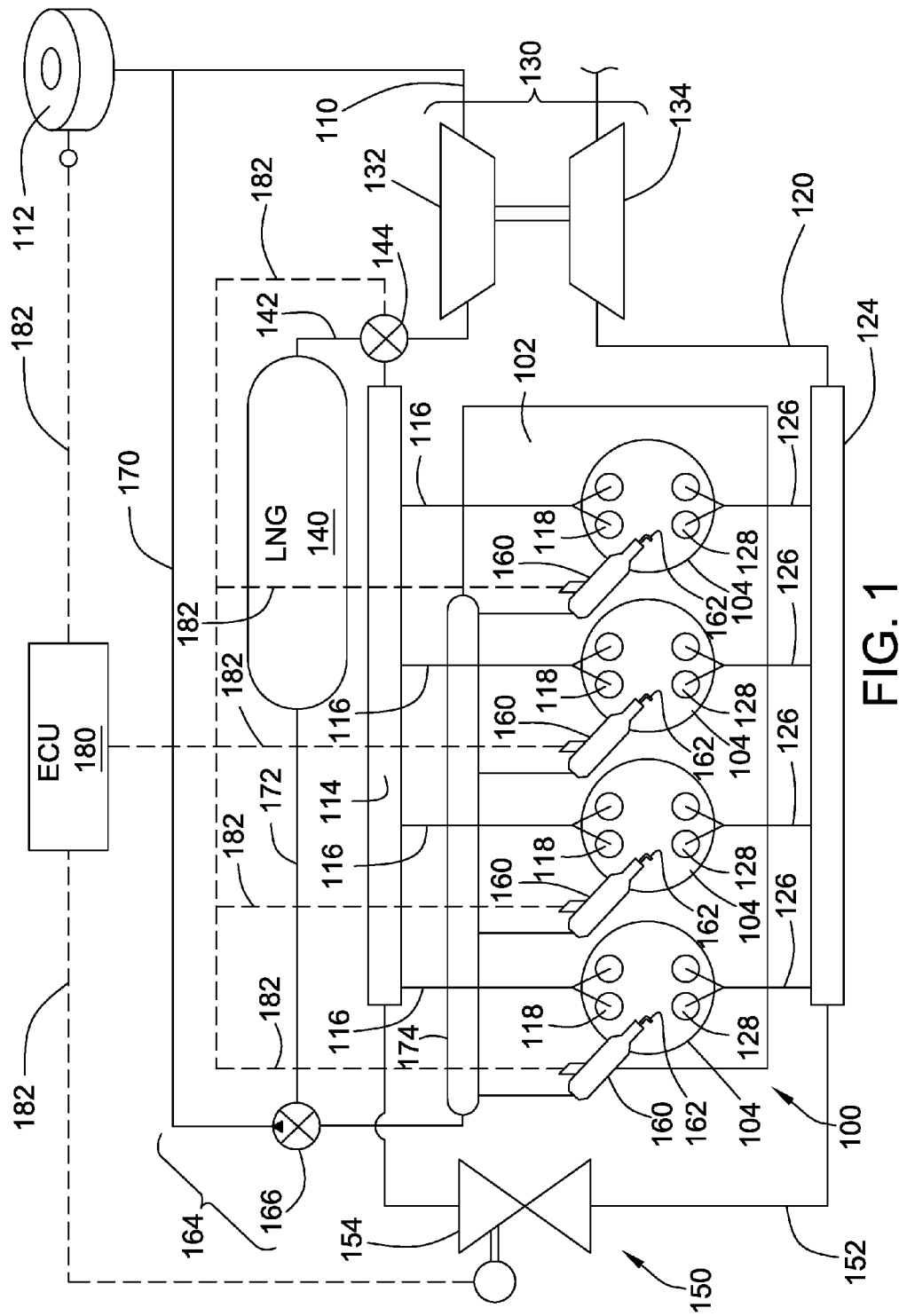
FIG. 1 is a schematic diagram of an internal combustion engine configured to combust fuel such as liquid or compressed natural gas and various components that assist in the operation of the engine.

Now referring to FIG. 1, wherein like reference numbers refer to like elements, there is illustrated an embodiment of an internal combustion engine 100 operatively associated with various component for conducting the process of combusting air and fuel to produce mechanical power. The internal combustion engine 100 can be utilized with any type of machinery, such as automobiles or other vehicles, construction or mining machines, pumps, generators, etc. The internal combustion engine 100 includes an engine block 102 having a plurality of combustion chambers 104 disposed therein. FIG. 1 illustrates a straight configuration of four combustion chambers 104 inline with each other, however, in other embodiments, different numbers of chambers and different configurations such as a V-configuration or an opposing cylinder configuration are contemplated. The combustion chambers 104 each define a volume in which the combustion of air and fuel occurs. The other components associated with the internal combustion engine 100 provide and direct the air and fuel to the combustion chamber and cause the combustion process to occur.

For example, to provide air to the internal combustion engine 100, an air intake conduit 110 having an air filter 112 disposed there along may be in communication with an intake manifold 114 that extends alongside the engine block 102. The intake manifold 114 can communicate with the combustion chambers 104 via a plurality of intake runners 116 that extend from the intake manifold to valve operated intake ports 118 disposed into the combustion chambers. The intake ports 118 enable intake air to be drawn into the combustion chambers 104 during an intake stroke of the combustion cycle. To exhaust the combusted air burned during the power stroke, an exhaust conduit 120 including an exhaust manifold 124 can extend along the engine block 102 generally parallel to the intake manifold 114. The exhaust manifold 124 can communicate with the combustion chambers 104 via a plurality exhaust runners 126 that extend to valve operated exhaust ports 128 disposed into the chambers. Hence, during the exhaust stroke of the combustion process, the exhaust gasses are directed from the combustion chambers 104 to the exhaust manifold 124 and away from the internal combustion engine 100 enabling the combustion cycle to start again.

To facilitate introduction of the intake air to the combustion chambers 104 via the intake manifold 114, in an embodiment the internal combustion engine 100 can be operatively associated with a turbocharger 130 disposed along and in fluid communication with the intake conduit 110 and the exhaust conduit 120. The turbocharger 130 can include a fan-like compressor 132 rotatably disposed in the intake conduit 110 that is coupled to a similarly structured turbine 134 rotatably disposed in the exhaust channel 120. When the exhaust gasses are forcibly discharged from the combustion cylinders 104 during the exhaust stroke, the flow of pressurized exhaust gasses in the exhaust conduit 120 causes the turbine 134 to rotate, which thereby rotates the compressor 132 in the intake conduit 110 thereby pressurizing the intake air.

To provide fuel for the combustion process, a fuel reservoir or fuel tank 140 can be operatively associated with the internal combustion engine 100. In the illustrated embodiment, the fuel tank 140 may contain liquid natural gas (LNG) or compressed natural gas (CNG) such as methane or propane held under pressure and/or refrigeration in the tank. However, in other embodiments, more traditional fuels such as gasoline or diesel may be utilized in the combustion process. To direct fuel to the combustion chambers 104, the fuel tank 140 may communicate via a fuel line 142 with a mixer 144 disposed in the intake conduit 110 upstream of the intake manifold 114. Hence, the fuel and intake air are premixed by the mixer 144 prior to introduction to the combustion chambers 104 via the intake stroke. In other embodiments, though, the fuel may be directly injected into the combustion chambers 104, or injected toward the intake ports 118 in port fuel injection, separately from the intake air.

To reduce the pollutants and harmful byproducts of the combustion process, the internal combustion engine 100 may be associated with various emission reduction techniques such as an exhaust gas recirculation (EGR) system 150. EGR operates by recirculating a portion of the exhaust gasses back to the combustion chambers 104 that can be recombusted with the newly introduced air and fuel. In the illustrated embodiment, the EGR system 150 can include an EGR line 152 communicating with the exhaust manifold 124 that diverts some of the exhaust gasses to the intake manifold 114. The exhaust gasses mix with the air and fuel in the intake manifold 114 prior to being drawn into the combustion chamber 104, thereby diluting the actual amount of air and fuel in the chambers. EGR serves to reduce the peak temperature generated during combustion because of its heat capacity, meaning the combustion process occurs at a lower temperature. The cooler combustion temperatures result in less formation of nitrogen oxides such as NO and $NO_2$ from the corresponding chemical elements in the intake air. To adjust the quantity of exhaust gasses the EGR system 150 recirculates, a selectively adjustable EGR valve 154 can be disposed in the EGR line 152 between the exhaust and intake manifolds 114, 124. While the present embodiment illustrates the EGR system 150 directing exhaust gasses directly to the intake manifold 114 separately from the intake air, in other embodiments, the exhaust gasses can be introduced and mixed with the intake air at other locations such as upstream of the turbocharger 130.

To initiate combustion of the mixture of air, fuel, and EGR if present in the combustion chamber 104, the internal combustion engine 100 can include a plurality of sparkplug assemblies 160 one of which is associated with each combustion chamber. Each sparkplug assembly 160 includes an electrode 162 that is disposed inside the combustion chamber and that is connected to an electrode or voltage source. At an appropriate time between the compression and power strokes, the sparkplug assembly is electrically activated causing a spark to form and jump between the electrode and a ground that ignites the compressed air and fuel mixture in the combustion chamber 104. To facilitate the ignition process, the sparkplug assembly can be configured to receive some of the air and fuel separately from the intake manifold 114 which is directed proximate to the electrode 162 to ensure that a sufficiently combustible mixture is present when the spark is generated. To direct this air/fuel charge to the electrodes 162, a high-pressure air/fuel source 164 can be operatively associated with each of the sparkplug assemblies 160. In an embodiment, the high-pressure air/fuel source 164 can include a second mixer or pump 166 that communicates with the intake conduit 110 upstream of the turbocharger 130 via a plug-air line 170 and directly communicates with the fuel tank 140 via a plug-fuel line 172. The pump 166 therefore receives air and fuel that are mixed together and directed as the pressurized air/fuel charge to a high-pressure air fuel runner 174 that extends along the engine block 102 and communicates with each of the sparkplug assemblies 160. It should be appreciated, however, that other configurations for the high-pressure air/fuel source 164 are contemplated by this disclosure.

To coordinate and control operation of the internal combustion engine 100 and related components, the engine may be operatively associated with an electronic control unit, module, or controller 180. The controller 180 monitors various operating parameters and responsively regulates the various components that affect engine operation. The controller 180 can include a microprocessor, an application specific integrated circuit (ASIC), or other appropriate circuitry and can have memory or other data storage capabilities. To monitor and control engine operation, the controller 180 can be in electrical or electronic communication with the engine components via a plurality of electrical communication lines 182 that are indicated as dashed lines in FIG. 1. For example, the controller 180 can be responsible for the timing and actuation of each of the sparkplug assemblies 160 and communicates individually with each of them. Additionally, the controller 180 can control the EGR process by monitoring and adjusting the EGR valve 154. The controller 180 can also monitor the intake air and further monitor or sense the composition, pressure and/or flow rate of the air and fuel mixed and introduced to the intake manifold 114. Although in FIG. 1 the controller 180 is illustrated as a single, discrete unit, in other embodiments, the controller and its functions may be distributed among a plurality of distinct and separate components.

Figure 2:
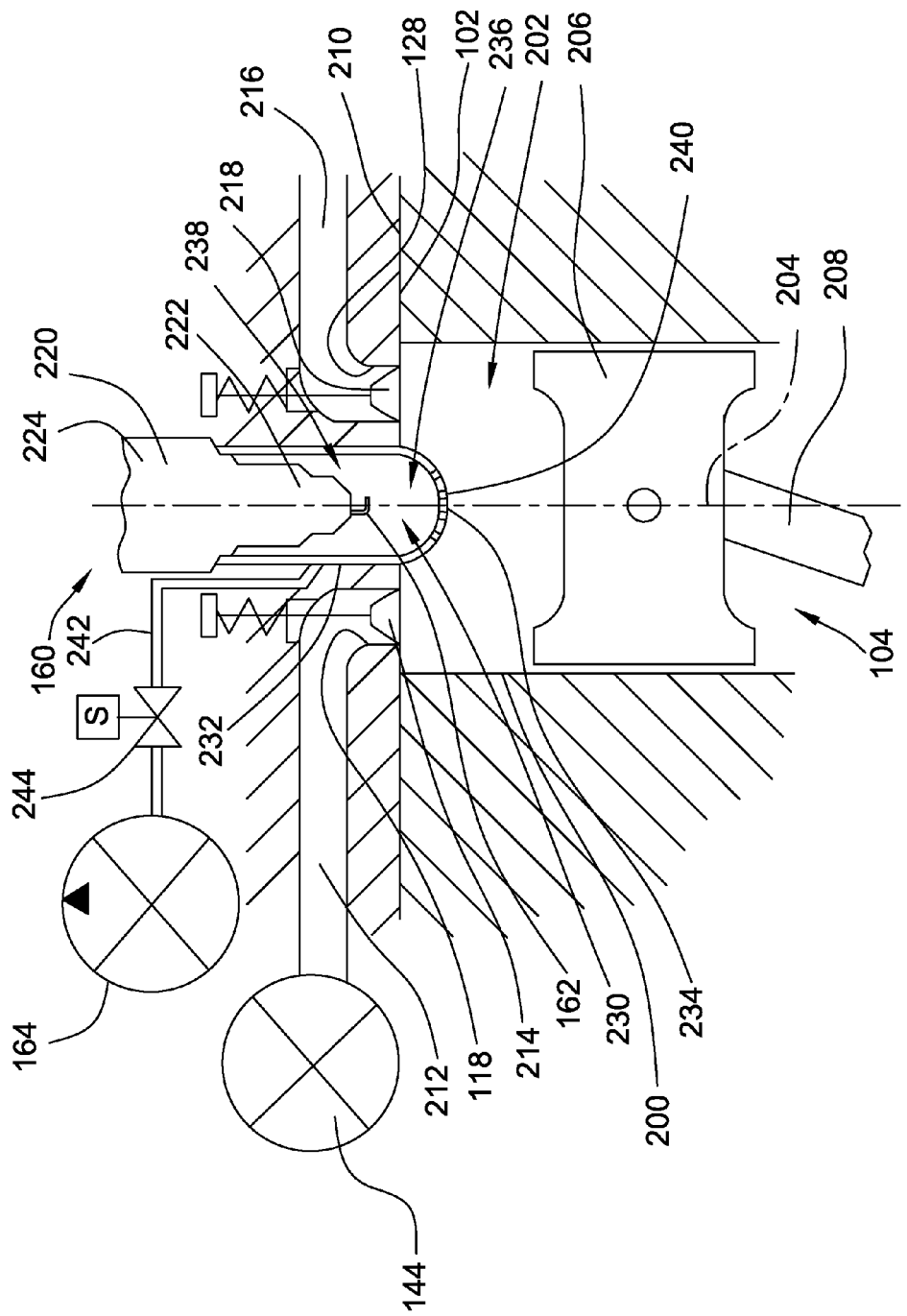
FIG. 2 is a cross-sectional diagram of a combustion chamber disposed in the internal combustion engine and operatively associated with a sparkplug assembly and prechamber volume designed in accordance with the disclosure.

Referring to FIG. 2, there is illustrated a cross-sectional schematic representation of a combustion chamber 104 of the internal combustion engine 100. To provide the volume in which the combustion of air and fuel occurs, the combustion chamber 104 includes cylinder 200 bored into the material of the engine block 102 that delineates a cylindrical-shaped volume 202 that may extend along an axis line 204. A piston 206 is reciprocally disposed in the volume and can make sliding contact with the walls of the cylinder 200 to move reciprocally upwards and downwards along the axis line 204. In particular, the piston 206 can move to an upward most position, referred to as top dead center (TDC) and to a downward most position, referred to as bottom dead center (BDC). Reciprocal motion of the piston in the cylinder 200 performs the familiar 4-stroke combustion cycle including an intake stroke (piston to BDC), a compression stroke (piston to TDC), a power or combustion stroke (piston to BDC), and an exhaust stroke (piston to TDC). Because of the up and down motion of the piston 206 between TDC and BDC, the capacity of the volume varies and is sometimes referred to the variable volume 202. The piston 206 itself is pivotally connected to a connecting rod 208 that in turn is operatively coupled to a rotatable crankshaft that converts the linear reciprocal motion of the piston to rotational, powered motion that is transferable and can be harnessed for work. Rotation of the crankshaft may correspond to linear motion of the piston and the strokes of the combustion cycle through a known relation, such as 0°=TDC start of intake stroke, 180°=BDC start of compression, 360°=TDC start of power stroke, 540°=BDC start of exhaust, and 720°=TDC end of cycle.

To enclose the variable volume 202, an overhead cylinder head 210 is secured to the top of the engine block 102. To direct air and/or fuel into the variable volume 202, an intake duct 212 can be disposed through the cylinder head 210 and communicates with the intake port 118 that opens through the cylinder head into the variable volume. To selectively open and close the intake port 118, an intake valve 214 such as a poppet valve or the like is operatively associated with the port and can be selectively activated by a timing mechanism such as overhead cams synched to the combustion cycle of the engine. Likewise, to remove the resulting exhaust gasses and combustion byproducts from the variable volume 202 during the exhaust stroke, an exhaust duct 216 can be disposed in the cylinder head 210 and communicates with the exhaust port 128 that may be selectively opened and closed by an exhaust valve 218. Upstream from the intake port 118, the intake duct 212 may directly or indirectly be in fluid communication with the mixer 144 to receive the mixture of air, fuel, and EGR such that, in the illustrated embodiment, the mixture enters the variable volume 202 simultaneously. However, in other embodiments, fuel may be introduced to the variable volume separately from the air through an injector disposed through the cylinder head 210 and mixes with the air and EGR therein.

As described above, to initiate combustion of the mixture of air, fuel, and any EGR introduced to the variable volume 202, the combustion chamber 104 is operatively associated with the sparkplug assembly 160 that, in the illustrated embodiment, may be a multiport sparkplug assembly. The sparkplug assembly 160 includes a generally elongated sparkplug 220 having a tip portion 222 and a body 224 that may be configured to secure the sparkplug to the cylinder head 210 by, for example, threads. The body 224 may further be made from electrically insulative material and may support electrical wiring or conductors that lead to the tip portion 222. The electrode 162 of the sparkplug assembly 160 can be located at the tip portion 222 in an exposed manner and can be in electrical communication with the wiring or conductors. In other embodiments, rather than employment of an actual sparkplug, the sparkplug assembly may use a smaller ignition element integrally incorporate therein and also having an electrode to generate a spark. As stated above, when an electrical charge is applied to the electrode 162, an electrical spark may form or jump across a gap that spaces apart the electrode and a corresponding ground. The spark can ignite any air and fuel that may be proximate the tip portion 222.

In the illustrated embodiment, the sparkplug assembly 160 includes a prechamber volume 230 delineated by a hollow prechamber shell 232 disposed around and enclosing the tip portion 222. The prechamber shell 232 may be a thin-walled structure and may include a distal end cap 234, located across the prechamber volume 230 from the tip portion 222 of the sparkplug 220, that is configured for placement through the cylinder head 210 into the variable volume 202. The prechamber volume 230 therefore defines a volume geometry having a cap region 236 proximate to the end cap 234 and a plug region 238 proximate to the sparkplug 220. In the illustrated embodiment, the prechamber volume 230 along with the sparkplug 220 may be centered along the axis line 204, though in other embodiments, the components of the sparkplug assembly may be arranged at different orientations. To establish fluid communication between the prechamber volume 230 and the variable volume 202, one or more ports 240 are disposed through the distal end cap 234, hence providing for the name multiport sparkplug assembly. The ports 240 may be arranged in various different directions and orientations through the distal end cap 234 to provide multiple and different entry points into the variable volume 202.

As indicated above, to ensure there is air and fuel proximate the electrode 162 to combust, the prechamber volume 230 may be in fluid communication with the high-pressure air/fuel source 164. In particular, a high-pressure channel 242, that may correspond to the pressurized fuel runner, can be disposed through the cylinder head 210 to establish fluid communication between the high-pressure air/fuel source 164 through the prechamber shell 232 into the plug region 238 of the prechamber volume 230. The high-pressure channel 242 may be oriented toward the tip portion 222 of the sparkplug 220 or other ignition element so that a pressurized air/fuel charge is directed proximately toward the electrode 162. In an embodiment, to introduce the pressurized air/fuel charge into the prechamber volume 230 at select instances, the high-pressure air/fuel source 164 may be operatively associated with an electrically actuated valve 244 disposed in the high-pressure channel 242. For example, the electrically actuated valve 244 may be a solenoid valve electrically controlled and selectively activated by the controller to selectively introduce and cease introduction of air and fuel to the prechamber volume. In an alternative embodiment, a pressure sensitive, spring-actuated mechanical valve can be utilized.

In operation, the high-pressure air/fuel source 164 directs a pressurized air/fuel charge to the prechamber volume 230 where it is ignited by the sparkplug 220. The combusting gasses are then directed through the ports 240 as flame jets in a dispersed manner to ignite the compressed mixture of air, fuel, and EGR if present in the variable volume 202 and initiate the power stroke. Although the pressurized air/fuel charge may be introduced to the prechamber volume 230 at any time during the combustion cycle, it should be appreciated that some residual gasses from the previous air/fuel charge combusted during the prior cycle may remain in the prechamber volume. Moreover, because the ports 240 establish fluid communication between the prechamber volume 230 and the variable volume 202, it can be appreciated from FIG. 2 that the prechamber volume can receive a portion of the exhaust gasses and combustion components from the variable volume as the piston 206 moves to the TDC position during the exhaust stroke. Additionally, during the compression stroke as the piston 206 compresses the air, fuel, and any EGR introduced to the variable volume 202, the prechamber volume 230 may receive a portion of those gasses. However, the ratio of air, fuel, and EGR in the variable volume 202 may not be optimal to initiate combustion in the pre-chamber volume 230.

INDUSTRIAL APPLICABILITY

Figure 3:
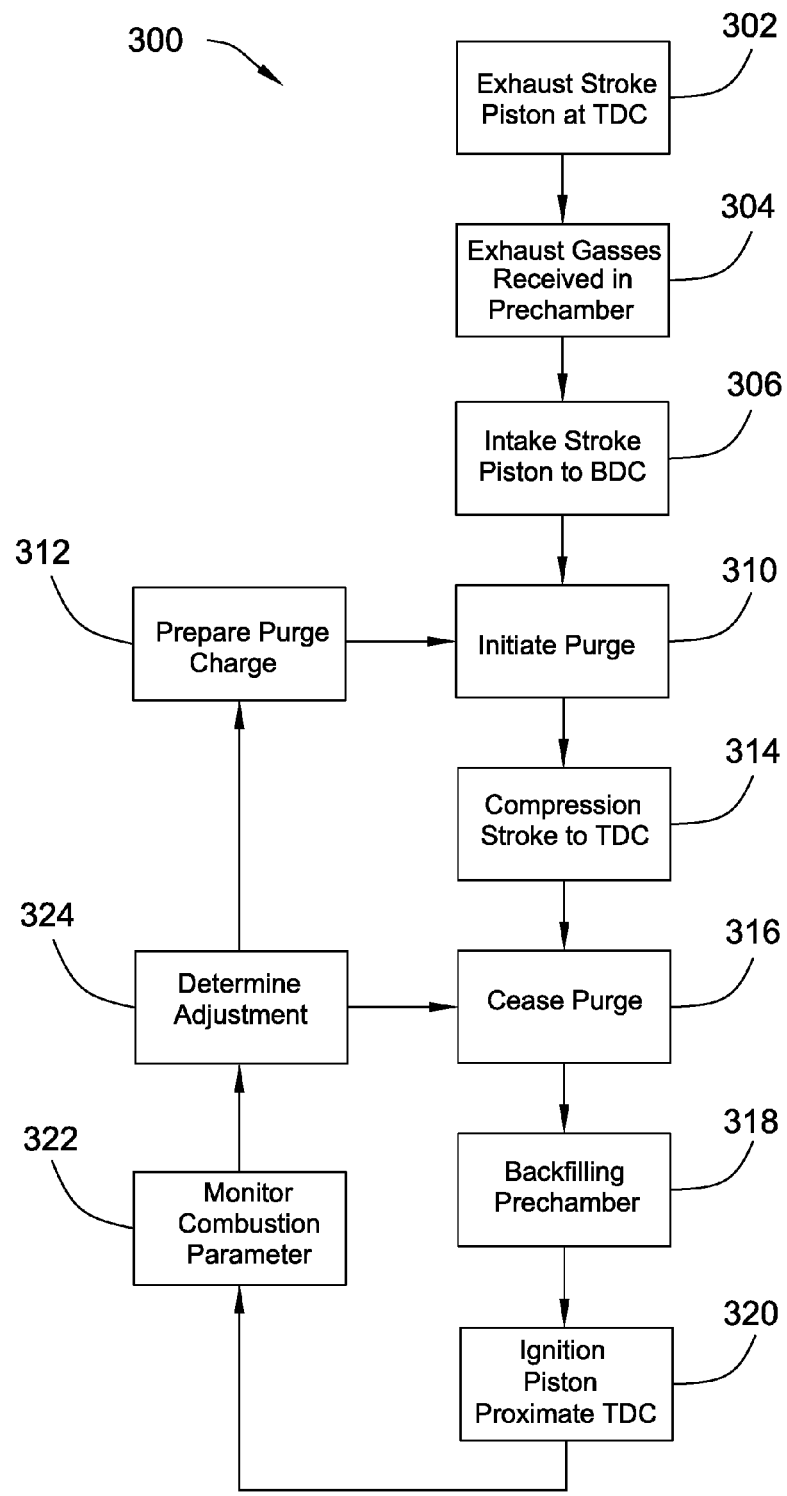
FIG. 3 is a flowchart illustrating possible steps of conducting a combustion cycle in the combustion chamber including the step of purging the prechamber volume with a pressurized air/fuel purge charge.

In view of the foregoing, to improve combustion in the prechamber volume 230, the timing, pressure, and/or air/fuel mixture at which the high-pressure air/fuel source 164 introduces the pressurized air/fuel charge are configured to purge or flush the prechamber volume of gasses therein. In particular, the air and fuel introduced can be optimized as a pressurized air/fuel purge charge timed to substantially purge the prechamber volume 230 while providing an air/fuel ratio that facilitates combustion. For example, referring to FIGS. 2 and 3, there is illustrated a process 300 or series of steps for purging the prechamber volume 230 with the air/fuel purge charge. The electronic controller operatively associated with the engine may conduct or carry out the illustrated process 300. The process 300 starts at the end of the prior combustion cycle as the combustion chamber 104 performs an exhaust stroke 302 during which the piston 206 moves to the TDC position. This may result in forcing some exhaust gasses and combustion byproducts into the prechamber volume 230, as indicated by step 304. The combustion chamber 104 next performs an intake stroke 306 in which the downward moving piston 206 draws air, fuel, and any EGR into the variable volume 202. The mixture of air, fuel, and EGR drawn in may be adapted to optimize the combustion event in the combustion chamber 104. For example, to improve efficiency and reduce emissions, the air/fuel ratio in the mixture of air, fuel, and EGR may be lean, meaning there is included a greater or excess amount of air as compared to fuel than would occur under stoichiometric conditions. In other embodiments, the air/fuel ratio in the mixture may be at stoichiometric conditions. In addition, to reduce or lower the temperature of combustion, and thereby reduce the formation of nitrogen oxides, a significant quantity of EGR may be introduced.

Next according to the process 300, an initiate purge step 310 may occur during the intake stroke to purge or flush out any gasses in the prechamber volume 230, which can be accomplished by directing the pressurized air/fuel purge charge from the high-pressure air/fuel source 164 into the prechamber volume 230. The initiate purge step 310 can be preceded by a prepare purge charge step 312 in which the high-pressure air/fuel source 164 prepares the pressurized air/fuel purge charge to facilitate purging and ignition in the prechamber volume. For example, the pressurized air/fuel purge charge may be prepared at a stoichiometric or approximately stoichiometric ratio of air to fuel, meaning the relative quantities of air and fuel are exactly enough to combust all of each component. For example, LNG may have a stoichiometric ratio of, e.g., 17.2:1, while lean conditions may occur at air/fuel ratios of, e.g., 30:1. The stoichiometric mixture will burn faster than lean mixtures resulting in a more energetic and complete combustion and improving the combustion in the main combustion chamber. The pressurized air/fuel purge charge may be prepared with low or no EGR present and configured to evacuate and maintain the prechamber volume substantially free of all exhaust gasses. Exhaust gasses slow the speed at which combustion of the pressurized air/fuel purge charge could otherwise occur in the prechamber, thereby reducing the efficiency of the ignition event.

The initiate purge step 310 may be initiated during the intake stroke when the pressure in the variable volume is relatively low or even under vacuum conditions to assist the pressurized air/fuel purge charge in evacuating the prechamber volume 230 and may continue through a portion of the compression stroke. Once at the BDC position, the piston 206 may begin the compression stroke 314 by moving upwards in the variable volume 202 to compress the mixture of air, fuel, and EGR therein, resulting in increasing or raising the pressure in the variable volume 202. To prevent the rising pressure from prematurely forcing the mixture of air, fuel, and EGR from the variable volume 202 into the prechamber volume 230, the high-pressure air/fuel source 164 may be configured to produce the pressurized air/fuel purge charge with a sufficiently high counter-pressure. For example, the pressurized air/fuel purge charge may be at 3 to 10 bars over ambient or atmospheric pressure. This assists in ensuring the prechamber volume 230 is substantially filled with the pressurized air/fuel purge charge and substantially lacks exhaust gasses from the variable volume 202.

At a particular instance during the compression stroke, the process 300 may cease purging the prechamber volume 230 in a cease purge step 316. To accomplish the cease purge step 316, the controller may direct that the electrically actuated valve 244 be closed isolating the high-pressure air/fuel source 164 from the sparkplug assembly 160. At this point, the rising pressure in the variable volume 202 may overcome the pressure in the prechamber volume 230 forcing some of the air, fuel, and EGR into the prechamber volume, which may be referred to as backfilling the prechamber volume 230. The timing of the cease purge step 316 and the initiation of backfilling the prechamber volume 318 may be configured to optimize the resulting constituents in the prechamber volume 230. For example, the cease purge step 316 may occur when the piston is about 30 degrees toward the TDC position and the end of the compression stroke. Under this condition, approximately 70% of the prechamber volume 230 may be from the pressurized air/fuel purge charge and 30% from the mixture of air, fuel, and EGR backfilled from variable volume 202. At this point in the process 300, just before the piston 206 reaches the TDC position, ignition 320 may occur via the sparkplug 220 or ignition element under direction of the controller combusting the mixture in the prechamber volume that propagates to the variable volume 202.

In an embodiment, to improve the process 300, a monitoring step 322 may be performed that measures or monitors a combustion parameter associated with the combustion event in the combustion chamber. For example, the combustion event may be determining the coefficient of variance (COV) of the indicated mean effective pressure (IMEP). The COV of IMEP may represent the variation of the average pressure acting on the piston 206 during the power stroke of the combustion cycle. Maintaining a lower COV of IMEP may result in efficiency improvements. Other combustion parameters monitored may include cylinder pressure, cylinder temperature, exhaust gas composition, and the like. The controller may conduct the monitoring step 322 through the sensors operatively associated with the combustion chamber 104 and/or other engine components. Moreover, the combustion parameters may be determined directly or indirectly by interpretation from other operating conditions. Under operation of the controller, the process 300 may determine to alter the steps by conducting a determine adjustments step 324 based on the monitored combustion parameter. For example, the determine adjustment step 324 may determine to adjust the timing of the cease purge step 316 so that the pressurized air/fuel purge charge is introduced earlier or later during the compression stroke thereby changing the composition or pressure in the prechamber volume. The determine adjustment step 324 may determine to alter the purge charge preparation step 312 to adjust the air/fuel ratio and/or pressure of the pressurized air/fuel purge charge prepared during the purge charge preparation step 312.

A possible advantage of the foregoing disclosure is the combusting process can utilize EGR in the variable volume while still providing a stoichiometric air/fuel purge charge to purge and initiate combustion in the prechamber volume. This enables combustion to occur in the prechamber volume quickly under low EGR presence to improve operation of the sparkplug assembly. These and other possible advantages should be apparent from the foregoing description.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A sparkplug assembly for an internal combustion engine comprising:
   a prechamber shell enclosing a prechamber volume, the prechamber shell including a distal end cap configured for placement in a combustion chamber and having a plurality of ports disposed therein;
   an ignition element including an electrode disposed in the prechamber volume;
   a high-pressure air/fuel source in fluid communication with the prechamber volume, the high-pressure air/fuel source being connected to an air line and a fuel line to receive air and fuel and mix the air and fuel to create a pressurized air/fuel purge charge, the high-pressure air/fuel source being configured to introduce the pressurized air/fuel purge charge into the prechamber volume during a compression stroke in the combustion chamber to purge gases from the prechamber volume into the combustion chamber and being further configured to cease introducing the pressurized air/fuel purge charge prior to activation of the ignition element.

2. The sparkplug assembly of claim 1, wherein the prechamber volume has a volume geometry extending between a cap region proximate the distal end cap and a plug region proximate the ignition element, the high-pressure air/fuel source in fluid communication with the plug region.

3. The sparkplug assembly of claim 2, wherein the high-pressure air/fuel source is configured to produce the pressurized air/fuel purge charge at a stoichiometric condition.

4. The sparkplug assembly of claim 3, wherein the high-pressure air/fuel source is operatively associated with an electrically actuated valve disposed in a high-pressure channel communicating with the prechamber volume, the electrically actuated valve selectively actuated by an electronic controller to selectively introduce and cease introduction of the pressurized air/fuel purge charge.

5. The sparkplug assembly of claim 1, further comprising an electronic controller operatively associated with the ignition element and the high-pressure air/fuel source, the electronic controller configured to direct the pressurized air/fuel purge charge into the prechamber volume prior to applying an ignition charge to the ignition element.

6. A method of conducting a combustion cycle in a combustion chamber comprising:
conducting an intake stroke during which a piston moveably disposed in the combustion chamber moves to a bottom dead center position;
introducing a pressurized air/fuel purge charge from a high-pressure air/fuel source into a prechamber volume associated with a sparkplug assembly disposed partially in the combustion chamber, thereby purging gasses from the prechamber volume to the combustion chamber;
conducting a compression stroke during which the piston moves toward a top dead center position;
maintaining introduction of the pressurized air/fuel purge charge into the prechamber volume to continue purging residual gasses from the prechamber volume to the combustion chamber;
ceasing introduction of the pressurized air/fuel purge charge prior to the piston reaching the top dead center position; and
igniting the pressurized air/fuel purge charge in the prechamber volume.

7. The method of claim 6, further comprising preparing the pressurized air/fuel purge charge to be approximately at stoichiometric conditions.

8. The method of claim 7, further comprising partially backfilling the prechamber volume with a mixture of air, fuel, and EGR from combustion chamber after ceasing introduction of the pressurized air/fuel purge charge.

9. The method of claim 8, wherein the mixture of air, fuel, and EGR is approximately at stoichiometric conditions.

10. The method of claim 9, wherein the prechamber volume contains by volume approximately 70% of the pressurized air/fuel purge charge and approximately 30% of the mixture of air, fuel, and EGR from the combustion chamber.

11. The method of claim 10, wherein the pressurized air/fuel purge charge does not include EGR.

12. The method of claim 11, wherein fuel of the mixture of air, fuel, and EGR and of the pressurized air/fuel purge charge is selected from a group comprising of liquid natural gas and compressed natural gas.

13. The method of claim 7, further comprising monitoring a combustion parameter associated with combustion in the combustion chamber.

14. The method of claim 13, further comprising adjusting, based on the combustion parameter, at least one of a timing of ceasing introduction of the pressurized air/fuel purge charge with respect to the position of the piston relative to the top dead center position, and a ratio of air to fuel of the pressurized air/fuel purge charge.

15. The method of claim 14, wherein the combustion parameter is selected from a group consisting of coefficient of variance (COV) of indicated mean effective pressure, cylinder pressure, cylinder temperature, and exhaust gas composition.

16. An internal combustion engine comprising:
a combustion chamber having a piston reciprocally movable therein between a top dead center position and a bottom dead center position;
a sparkplug assembly operatively associated with the combustion chamber, the sparkplug assembly including a prechamber volume delineated by a prechamber shell and in fluid communication with the combustion chamber via a plurality of ports disposed through the prechamber shell, the sparkplug assembly further including an ignition element having an electrode disposed in the prechamber volume; and
a high-pressure air/fuel source operatively associated with the sparkplug assembly and in fluid communication with the prechamber volume, the high-pressure air/fuel source being connected to an air line and a fuel line to receive air and fuel and mix the air and fuel to create a pressurized air/fuel purge charge, the high-pressure air/fuel source being configured to direct the pressurized air/fuel purge charge to the prechamber volume as the piston moves through a compression stroke from the bottom dead center position to the top dead center position to purge gasses from the prechamber volume into the combustion chamber.

17. The internal combustion engine of claim 16, further comprising an EGR system for introducing EGR to the combustion chamber, and the pressurized air/fuel purge charge does not include EGR.

18. The internal combustion engine of claim 17, wherein a mixture of air, fuel, and EGR are presented in the combustion chamber prior to the compression stroke.

19. The internal combustion engine of claim 18, wherein the pressurized air/fuel purge charge directed from the high-pressure air/fuel source is at stoichiometric conditions and the mixture of air, fuel and EGR are approximately at stoichiometric conditions.

20. The internal combustion engine of claim 18, wherein the high-pressure air/fuel source is configured to cease directing the pressurized air/fuel purge charge to the prechamber volume during the compression stroke.

* * * * *